May 3, 1960      M. H. DOCKEN      2,934,822
DEVICE FOR CUTTING SHEET MATERIAL
Filed Feb. 10, 1958      2 Sheets-Sheet 1
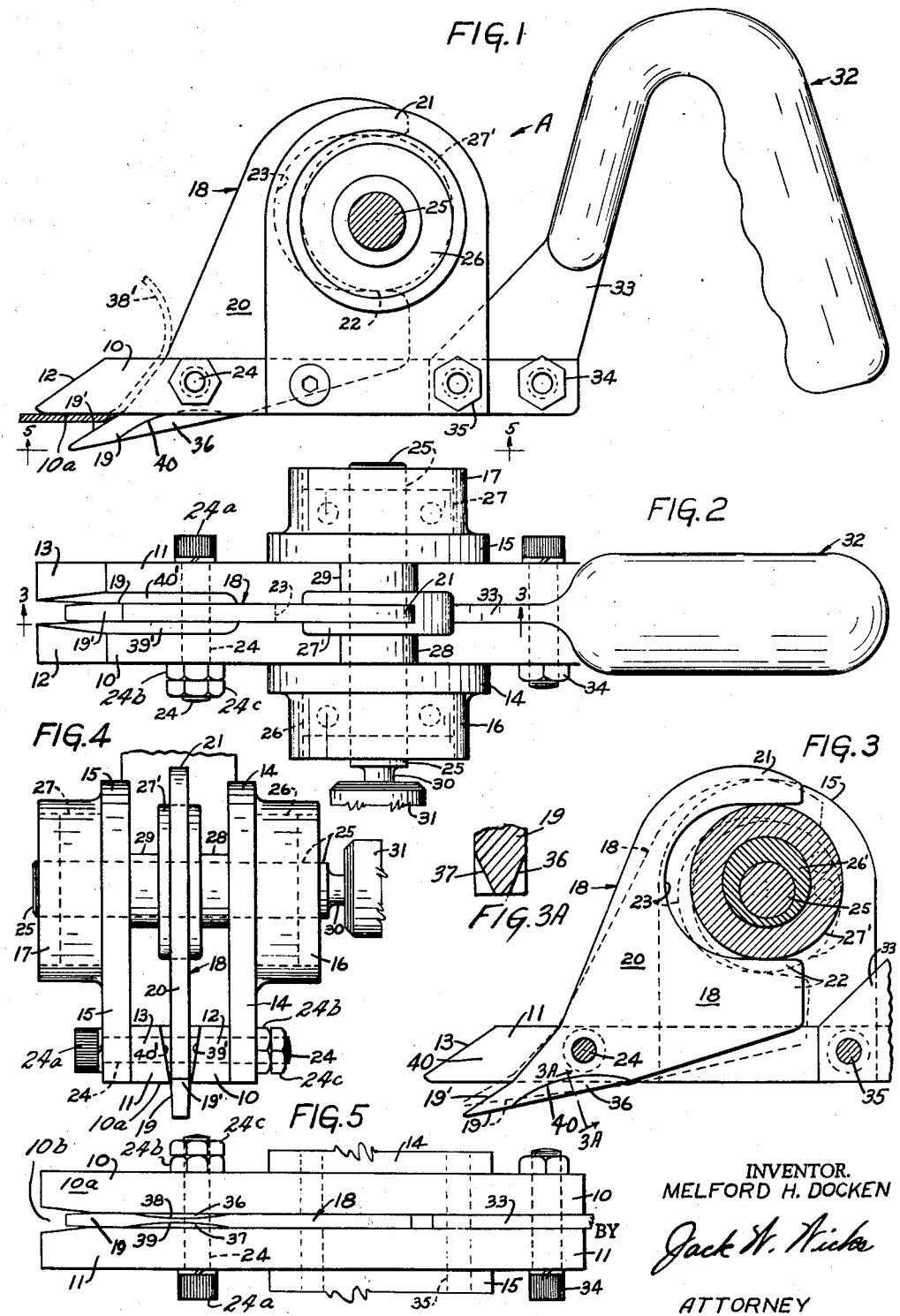
INVENTOR.
MELFORD H. DOCKEN
BY
ATTORNEY

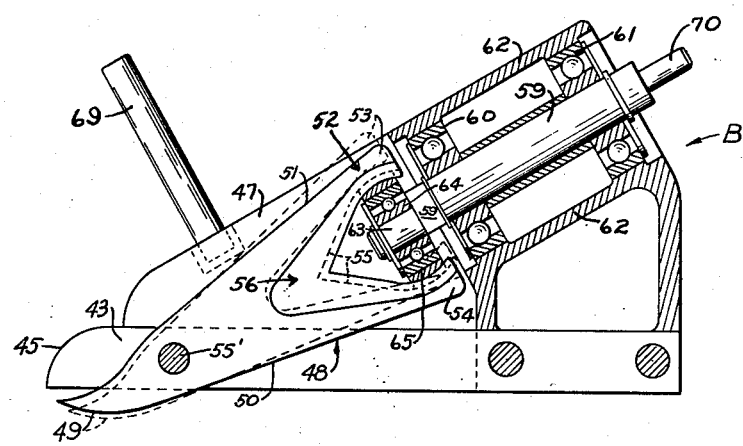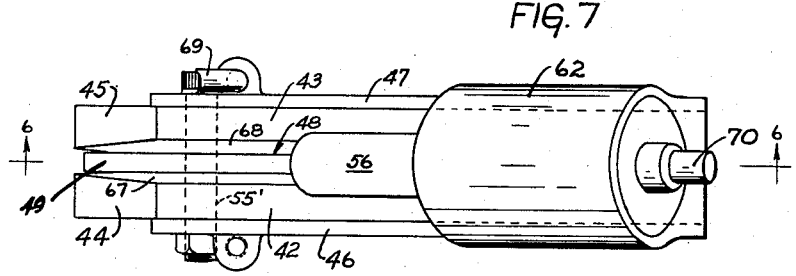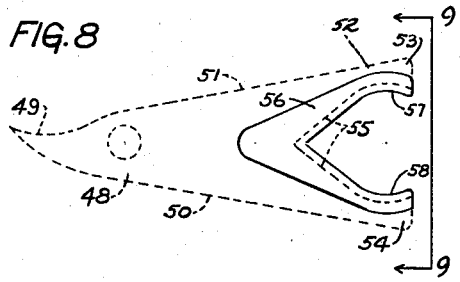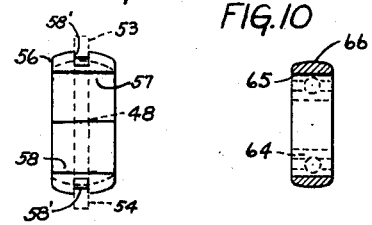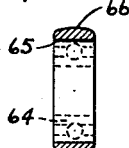

United States Patent Office 2,934,822
Patented May 3, 1960

2,934,822
DEVICE FOR CUTTING SHEET MATERIAL

Melford H. Docken, Minneapolis, Minn., assignor of one-half to Clifford W. Lind, Minneapolis, Minn.

Application February 10, 1958, Serial No. 714,402

1 Claim. (Cl. 30—228)

My invention relates to an improvement in a device for cutting sheet material such as metal, plastic, etc., and more particularly to a construction therefor adaptable to be used in a portable hand-operated tool.

It is an object of my invention to provide a device for cutting sheet material having a new and novel cutter member so constructed and mounted as to cooperate with spaced base shearing members and to be highly effective in the shearing of material.

It is a further object to provide a cutting device with which a portion of a piece of material may be cut from the center thereof without rupturing the material.

It is an additional object to provide a cutting device which does away with the need for left and right hand shears.

It is also an object of my invention to provide a cutting device which can be easily moved against the material for cutting, and which will cut an irregular path, large or small circles, or on a straight line.

It is a further object to provide a cutting device having a pivotally mounted cutter blade having means for positively actuating the blade to give a powerful shearing action.

I shall not here attempt to set forth and indicate all of the various objects and advantages incident to my invention, but other objects and advantages will be referred to in or else will become apparent from that which follows.

The invention will appear more clearly from the following detailed description when taken in connection with the accompanying drawings, showing by way of examples, preferred embodiments of the inventive idea, wherein like numerals refer to like parts throughout.

In the drawings forming part of this application:

Figure 1 is a side elevational view of my device for cutting sheet material.

Figure 2 is a top plan view thereof.

Figure 3 is a sectional view on the line 3—3 of Figure 2.

Figure 3A is an enlarged fragmental view taken in section on the line 3A—3A of Figure 3.

Figure 4 is a front view with the handle connection not shown.

Figure 5 is a bottom plan view on the line 5—5 of Figure 1.

Figure 6 is a sectional view of a further embodiment of my invention substantially on the line 6—6 of Figure 7.

Figure 7 is a top plan of the device shown in Figure 6.

Figure 8 is a side elevational view of the cutter blade of the construction shown in Figures 6 and 7.

Figure 9 is an end view of the cutter shown in Figure 8 on the line 9—9 of Figure 8.

Figure 10 is a sectional view of the ring which is mounted on the bearing for actuation of the cutter blade.

Referring to the drawings in detail, my device A includes the longitudinal parallelly-disposed and spaced base members 10 and 11, each formed with the angularly-disposed front portions 12 and 13 respectively. Secured to outside surfaces of each of the base members 10 and 11 are the upright support members 14 and 15 respectively, and extending from each and formed integrally therewith, are the bearing supports 16 and 17 respectively. Base members 10 and 11 define a common bottom surface 10a for gliding in contact with a sheet to be cut. The base members 10 and 11 further define, in their spaced relation, a slot 10b formed through said bottom surface, the edges of the slot 10b at the forward portion thereof being sharp for cutting purposes.

The numeral 18 designates the substantially flat cutter member formed with the somewhat pointed forward foot end 19, having the angular portion 19', the main body portion 20, the upper arm portion 21 and the lower arm portion 22, formed by the semicircular opening 23. The cutter member 18 is pivotally mounted adjacent the foot end portion 19 thereof in slot 10b between the base members 10 and 11, by means of the nut-equipped pin 24 which extends transversely of slot 10b through holes formed on an axis above the bottom surface 10a in each of the base members 10 and 11 and the cutter 18. It will be observed that pin 24 has a head 24a and a bearing nut 24b threadedly secured at the other end, which head and nut bear convergently against the base members 11 and 10 respectively. A lock nut 24c locks the nut 24b in adjusted position, which of course, determines the relative shearing clearances between the cutter end 19 and the cooperating shearing base members 10 and 11. The nut-accepting pin 24 therefor serves a dual function in providing a pivot means for cutter 18 and an adjustable interbracing element for the shearing base members.

I further provide the shaft 25 rotatably mounted in the bearings 26 and 27, mounted in the bearing supports 16 and 17 respectively. The shaft 25 has secured thereto the cam disc member 26' secured to the shaft 25 with the axis thereof offset from the axis of the shaft 25. Mounted on the cam disc 26, and in line with the cutter 18, is the ball bearing member 27', the outer peripheral surface of which forms a rotating cam. Formed as part of the shaft 25 and interposed between the cam disc 26' and the upright support members 15 and 16, are the spacers 28 and 29. The outer end of the shaft 25 is reduced, as at 30, whereby a chuck member 31 may be attached thereto. The chuck 31 may be driven directly by an electric motor or a flexible shaft, not shown, whereby the shaft 25 may be rotated.

The numeral 32 designates a handle, the lower flattened end portion 33 of which is secured between the base members 10 and 11 by the nut-equipped bolts 34 and 35, so that the entire unit may be guided in the direction of the cut to be made.

The forward side edges of the cutter 18, substantially at the slender end 19 constitute the shearing or working portion thereof. The side faces of slender end 19 are cut or dished, as at 36 and 37, between the arcs 38 and 39 on the under edge, and the arcs 40 on the sides of the cutter, respectively. The dished side face portions 36 and 37 of the cutter 18 converge sharply rearwardly and downwardly from the working portion as shown in Figures 3 and 3A and thereby allow the cut material to angularly pass the cutter, whereby the cutter may be used to cut on curved lines. The forward inner side faces of the base members 10 and 11 are relieved or slanted divergently upward from bottom surface 10a to top, as at 39' and 40' respectively, to facilitate the cutting or shearing action of the working portion of oscillating cutter 18 with the base members 10 and 11.

In using the cutter A, the shaft 25 is rotated by the power means available. As the shaft 25 rotates, the disc 26' rotates eccentrically, thereby causing the bearing cam 27' to travel eccentrically about the shaft 25 bearing against the upper arm 21 and the lower arm 22, alternately, to thereby cause a shearing action of the working portion of slender cutter end 19 with the outer under ends of base members 10 and 11. The portion 38' ribbon cut from a sheet of material leaves a narrow space along the cut line through which the slender end 19 of the cutter operates, and then passes upwardly in clearance between the side faces of the base members 10 and 11, as indicated by the broken lines 38 in Figure 1.

In Figure 6 is illustrated a further embodiment of my invention, wherein the cutting device B includes the longitudinal parallelly-disposed base members 42 and 43, each formed with the angularly-disposed front portions 44 and 45 respectively. Secured to the outer sides of the base members 42 and 43 are the plate members 46 and 47 respectively. I further provide the substantially flat cutter member 48, which is formed with a generally pointed forward end 49 and diverging side edges 50 and 51 terminating in a bifurcated rear end portion 52, composed of the upper arm 53 and the lower arm 54, formed by the somewhat V-shaped opening 55. The cutter 48 is pivotally mounted between the base members 42 and 43 by means of the pin 55'.

The arm members 53 and 54 and a portion of the cutter body connecting the arms at the opening 55, are edged or lined with the substantially V-shaped "nylon" shoe member 56 forming the bearing points 57 and 58 of the arms 53 and 54 respectively. The shoe 56 is recessed as at 58' to receive the edges formed by the opening 55, and the shoe may be molded upon the rear end of the cutter 48.

Further provided is the shaft 59 rotatably mounted in the bearings 60 and 61, mounted in the housing 62 connected to the plate members 46 and 47. The numeral 63 designates the stub shaft extending from the shaft 59 with the axis thereof offset from the axis of the shaft 59. Mounted on the stub shaft 63 is the ball bearing member 64, on which is pressed the ring 65, the arcuate outer peripheral portion 66 of which bears against the surfaces 57 and 58 of the shoe member 56. The bearing member together with the ring 65 is actually a rotating cam.

The inner vertical surfaces of the base members 42 and 43 are relieved or angularly disposed from the bottom edge upwardly and outwardly, as at 67 and 68 respectively. A handle 69 is provided, whereby the entire unit may be moved or directed on the sheet metal to be cut. The shaft 59 is provided with the reduced end portion 70 extending from the housing 62. A flexible shaft or motor may be connected to the shaft reduced portion 70 to rotate the same.

When the shaft 59 is rotated, the ring 65 is eccentrically rotated by means of the stub shaft, hereinbefore described. As the cam ring 65 is rotated, it alternately contacts the shoe portion of the upper and lower arm portions 53 and 54, and causes the cutter blade to pivot on the pin 55' to effect a shearing action between the end portion 49 and the base portions 42 and 43, illustrated by the broken lines in Figure 6.

With my device a portion of a piece of material may be cut from the center thereof without rupturing or warping the material by drilling a small hole through the material and inserting the end 19 or 49 therein whereby cutting may be started. The construction of my device including the tip ends 19 or 49 allows such type of cutting with no resultant warping of the material adjacent the cut. As hereinbefore pointed out my device will cut either left or right thus doing away with the necessity of left or right hand shears.

The invention is not to be understood as restricted to the details set forth, since these may be modified within the scope of the appended claim without departing from the spirit and scope of the invention.

Having thus described the invention, what I claim as new and desire to secure by Letters Patent is:

In a device for cutting sheet material, a base member having a bottom surface adapted to glide in contact with a sheet to be cut, said base member having a slot formed through said surface, the edges of the slot at the forward portion thereof constituting a pair of cutting edges, said slot having side faces diverging upwardly from the cutting edges, a cutter member disposed within said slot and pivotally mounted thereacross on a transverse axis spaced above the plane of said surface, said cutter member having a slender working portion lying transversely of said surface, said working portion having cutting edges cooperating in shearing action with the cutting edges of the base member and having side faces which converge sharply rearwardly and downwardly from the working portion, and means engaging the cutter member for oscillating the same on its pivotal mount whereby, during cutting, the sheet material will be cut in a ribbon leaving a narrow space, the ribbon maintaining clearance with the divergent faces of the slot and the narrow space of the sheet maintaining clearance with the convergent faces of the cutter member to permit turning of the device when making a curved cut in the sheet.

References Cited in the file of this patent

UNITED STATES PATENTS

| 596,546 | Runyan | Jan. 4, 1898 |
| 1,201,106 | Shuter | Oct. 10, 1916 |
| 2,125,556 | Gleich | Aug. 2, 1938 |
| 2,163,088 | Grant | June 20, 1939 |
| 2,244,638 | Boardman | June 3, 1941 |
| 2,272,295 | Forss | Feb. 10, 1942 |
| 2,348,876 | Beard | May 16, 1944 |
| 2,357,197 | Hood | Aug. 29, 1944 |
| 2,652,626 | Dutcher | Sept. 22, 1953 |
| 2,760,265 | Draenert | Aug. 28, 1956 |

FOREIGN PATENTS

| 807,075 | France | Oct. 5, 1936 |